April 22, 1947.　　A. T. SCHEIWER　　2,419,503
COUPLING
Original Filed Jan. 20, 1943
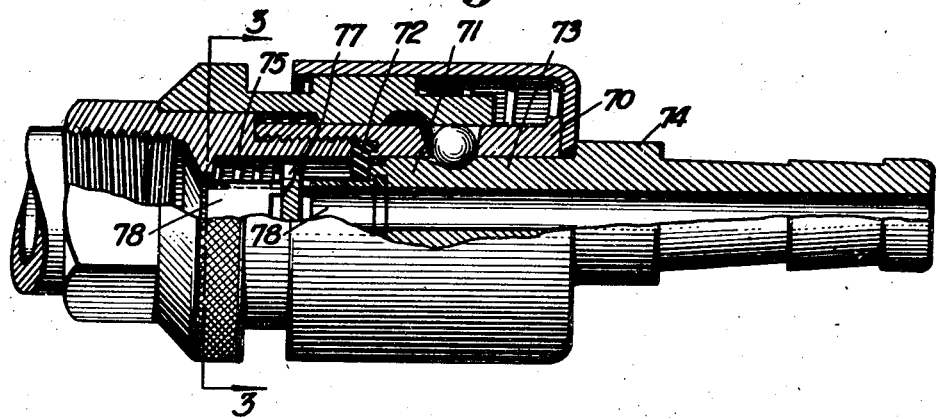
Fig. 1.
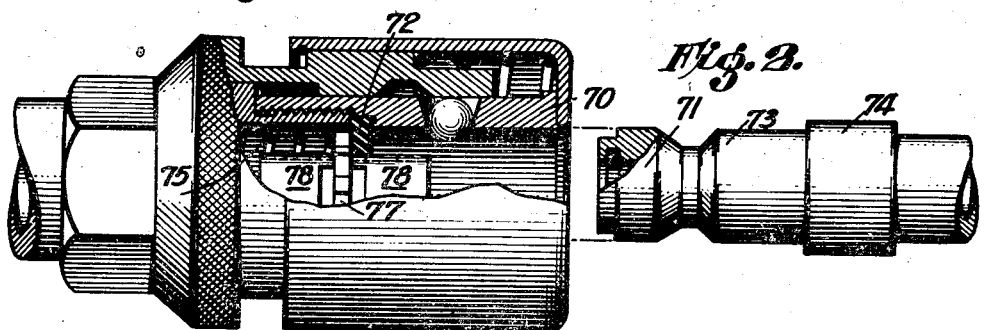
Fig. 2.
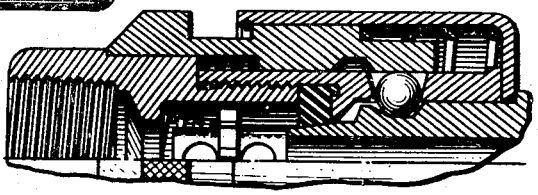
Fig. 4.
Fig. 3.
Fig. 5.
INVENTOR:
ALBERT T. SCHEIWER,
By Albert T. Scheiwer
ATTORNEY.

Patented Apr. 22, 1947

2,419,503

UNITED STATES PATENT OFFICE 2,419,503

COUPLING

Albert T. Scheiwer, Erie, Pa.

Original application January 20, 1943, Serial No. 473,032. Divided and this application June 13, 1944, Serial No. 540,149

3 Claims. (Cl. 284—19)

This application relates generally to couplings, and more particularly to swiveling, quickly attachable and detachable couplings.

All devices of this character made according to the teachings of the prior art, and with which I am familiar, especially those having check valves, have had a restricted area for the passage of fluid. Many couplings now on the market do not swivel and they become uncoupled in use. Prior couplings required two hands to make the coupling, which has been a hindrance in many situations.

The check valves in prior couplings have a tendency to tilt thereby locking it, and thereby permitting free flow of fluid.

This application is a division of Serial No. 473,032, now Patent 2,377,812.

It is accordingly, an object of my invention to overcome the above and other defects in couplings and it is more particularly an object of my invention to provide a quickly attachable and detachable coupling which is simple in construction, economical in cost and manufacture, easy to operate, and efficient in operation.

Another object of my invention is to provide a fluid tight swiveling coupling which can be snapped together with one hand.

Another object of my invention is to provide a coupling which is detachable only by the intervention of manual means.

Another object of my invention is to provide a coupling having a check valve disposed thereon which has a maximum unrestricted area for the flow of fluid therethrough.

Another object of my invention is the provision of a novel check valve in a coupling.

Another object of my invention is to provide a coupling wherein a snap connection can be made by merely inserting the male member into the female member.

Other objects of my invention will become evident from the following detailed description taken in conjunction with the accompanying drawings, in which:

Fig. 1 is a side elevational view with parts broken away of my novel coupling showing a form of check valve.

Fig. 2 is an exploded side elevational view with parts broken away of the coupling shown in Fig. 1.

Fig. 3 is a view taken on the line 3—3 of Fig. 1.

Fig. 4 is a fragmentary side elevational view with parts broken away of another form of male connecting member used with the check valve shown in Figure 5.

Fig. 5 is a perspective view of the check valve in my novel coupling shown in Fig. 4.

Referring now to the drawings, Figs. 1 to 5 show a male member 1 having a shoulder 2, a connecting portion 3 and an annular groove 4.

A male member 74 has a head 71 on the connecting portion 73 for abutting in sealing relationship with the washer 72. An internal annular washer 72 in the head 71 engages apertured tubular portions 78 of a check valve with a centrally disposed guiding flange 78 having longitudinally extending grooves around the circumference thereof for the passage of fluid. It will be noted that a double seal is provided in this form of coupling and the check valve may be reversed. The guiding flange 78 is made of such width that there is no cocking of the check valve thereby always assuring a perfect seal when the male and female members 70 and 74 are disconnected and a spring 75 urges the flange 77 in sealing relationship with the washer 72 in the female member 70.

In operation, the check valve may be assembled with either tubular end 78 adapted to engage the washer 72 in the head 71. When the male member 74 is inserted in the female member 70, the washer 72 engages the tubular portion 78 to force the flange 77 away from the washer 72 to permit the free flow of fluid through the coupling.

Fig. 4 shows a female member of substantially the same construction as the female member 70 shown in Fig. 1. The check valve is the same as the check valve shown in Figs. 1 and 5. The particular difference is the use of a conventional male member to engage the check valve 78. The operation is the same as that described for the check valve and coupling in Fig. 1.

It will be seen from the foregoing description that I have provided a quickly attachable and detachable swiveling coupling which can be coupled by merely inserting the connecting portion of the male member into the female member and which is not easily disconnected by movement of the coupling on the ground.

Various changes may be made in the specific embodiment of the present invention without departing from the spirit thereof, or from the scope of the appended claims.

What I claim is:

1. In a quickly attachable and detachable coupling, in combination, a male member, a female member having a cylindrical internal portion and an internal shoulder, means for connecting said male and female members together, an annular washer disposed adjacent said internal shoulder, a reversible spring-urged plate member having a grooved peripheral portion substantially the internal diameter of the internal portion of said female member, similar apertured cylindrical members each having laterally disposed apertures extending axially from opposite sides of said plate member, one of said cylindrical members being constantly in engagement with the internal portion of said washer, said plate member being urged in sealing relationship with said washer when said male and female members are disconnected, and being movable away from said washer when said cylindrical member in engagement with said washer is engaged by said male member when said male and female members are connected together.

2. In a quickly attachable and detachable coupling, in combination, a male member, a female member having a cylindrical internal portion, means for connecting said male and female members together, an annular washer, a reversible plate member having a grooved peripheral portion substantially the internal diameter of said internal portion of said female member, apertured cylindrical members having laterally disposed apertures extending axially from both sides of said plate member, one of said cylindrical members being constantly in engagement with the internal portion of said washer, and a spring member for urging said plate member into engagement with said washer when said male and female members are disconnected, said plate member being movable longitudinally against said spring for free flow of fluid when said male member is connected to said female member.

3. In a quickly attachable and detachable coupling, in combination, mated coupling members, one of said coupling members having an interior portion, a shoulder on said interior portion, means for connecting said mated coupling members together, a reversible check valve comprising an apertured cylindrical member having laterally extending apertures, and an intermediate shoulder with a grooved peripheral portion, a washer adjacent said shoulder engageable alternately by either end of said cylindrical member, a spring for moving said shoulder on said check valve in sealing relationship with said washer when said mated coupling members are disconnected, said check valve being movable longitudinally when said mated coupling members are connected together.

ALBERT T. SCHEIWER.

REFERENCES CITED

The following references are of record in the file of this patent:

UNITED STATES PATENTS

| Number | Name | Date |
|---|---|---|
| 2,307,427 | Smith et al. | Jan. 5, 1943 |
| 2,092,116 | Hansen | Sept. 7, 1937 |
| 2,135,221 | Scheiwer | Nov. 1, 1938 |
| 2,135,222 | Scheiwer | Nov. 1, 1938 |
| 2,255,333 | Scheiwer | Sept. 9, 1941 |